H. H. HART.

FAN HOUSING COOLING EXTENSION.

APPLICATION FILED JAN. 9, 1920.

Reissued Aug. 16, 1921. 15,178

INVENTOR
HERBERT H. HART
BY Hazard & Miller
ATT'YS.

UNITED STATES PATENT OFFICE.

HERBERT H. HART, OF ORCUTT, CALIFORNIA.

FAN-HOUSING COOLING EXTENSION.

15,178. Specification of Reissued Letters Patent. Reissued Aug. 16, 1921.

Original No. 1,275,682, dated August 13, 1918, Serial No. 186,234, filed August 14, 1917. Application for reissue filed January 9, 1920. Serial No. 350,460.

*To all whom it may concern:*

Be it known that I, HERBERT H. HART, a citizen of the United States of America, residing at Orcutt, county of Santa Barbara, State of California, have invented a certain new and useful Improvement in Fan-Housing Cooling Extensions; and I do hereby declare the following to be a full, clear, and exact description of the invention, such as will enable others skilled in the art to which it appertains to make and use the same.

My object is to improve the lay-out and construction of a fan housing to be bolted on to the rear of the radiator of any type of automobile, motor truck, or the like, for the purpose of better cooling the radiator and engine, by producing a better suction of air, with the aid of the fan, through the tubes of the radiator, and concentrating this cool air directly on the engine.

Ordinarily, without my invention, the suction of air is only noticeable in a small spot directly in front of the fan and the cool air is distributed mostly around the hood of the engine where it does very little good.

Specifically, my object is to make a fan-housing cooling extension which may be readily applied or removed, which will form a close joint all around the radiator, which may be pressed tightly into place, which has non-metallic packing and cushions to form a tight joint and prevent rattling, and which will draw air through all parts of the radiating field and concentrate the air upon the hottest part of the engine.

The drawing illustrates the invention.

Figure 1:
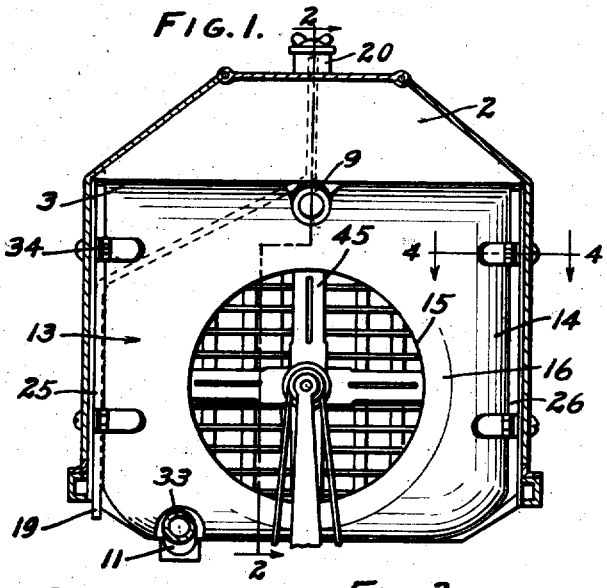
Figure 1 is a vertical cross-section showing my fan housing cooling extension in position for use and attached to the rear side of the radiator and extending backwardly around the fan, the view being taken on the line 1—1 of Fig. 2.

The radiator 1 has a dome 2 and this dome extends backwardly beyond the radiator tubes, thus producing a flat lower face 3 extending backwardly across the top of the radiator and below the dome. The side-walls 4 of the radiator 1 extend backwardly beyond the tubes and form flanges 5 and the rear edges 6 of these flanges are off-set inwardly, as shown in detail in Fig. 4. Transverse flanges 7 extend inwardly from the sides 4 immediately behind the tubes, and at the forward edges of the flanges 5, thereby forming right-angled corners. The top of the engine jacket 8 is connected to the dome 2 by a pipe 9. The lower water chamber 10 below the tubes of the radiator 1 is connected to the lower part of the engine jacket by a pipe 11. The rear side of the chamber 10 has a vertical transverse flat face 12.

Figure 2:
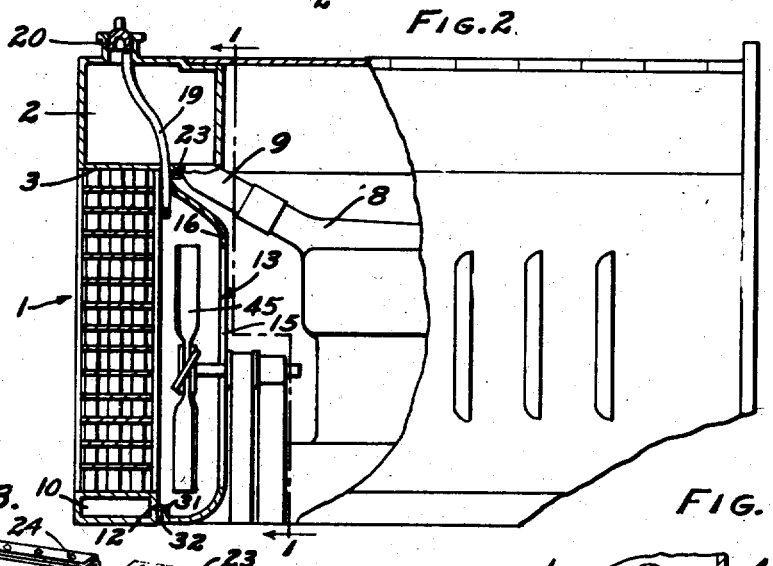
Fig. 2 is a vertical longitudinal section on the line 2—2 of Fig. 1.
Figure 3:
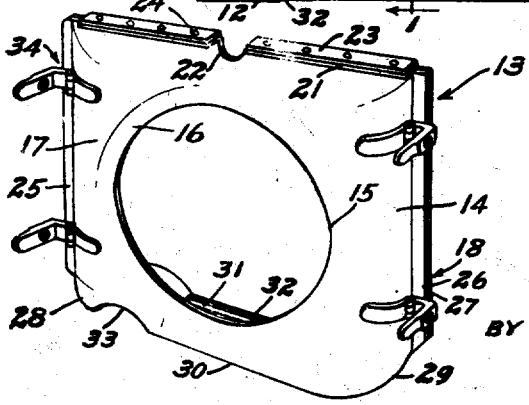
Fig. 3 is a perspective of the fan housing cooling extension removed from the radiator and fan.

The details of the fan housing cooling extension 13 are as follows:

The body 14 is preferably stamped from sheet metal and has a circular central opening 15, the margins 16 around the opening 15 being substantially flat so that it will stand in a transverse vertical plane, as shown in Fig. 2. The intermediate portion 17 immediately surrounding the flat portion 16, and the rim 18 is constructed to fit the radiator to which the housing is to be applied.

The overflow pipe 19 extends from the radiator cap 20 through the flat face 3 directly behind the pipe 9 and then extends laterally behind the tubes of the radiator 1 and downwardly inside of one of the flanges 5.

An important feature of the improved radiator extension is that it forms a frame or rim 18 designed to lie snugly against the substantially rectangular frame portion of the radiator surrounding the interstitial field formed by the radiating tubes so that air is drawn through the entire field of the radiator and is concentrated in the dished extension and discharged through the comparatively smaller opening 15. It will be noticed that the top of the opening 16 is disposed substantially in the top plane of the motor cylinders so that the maximum efficiency of the cooling stream of air is obtained because of the direction of the air stream directly toward the body of the motor.

A flange 21 extends backwardly from the upper edge of the portion 17 and has a notch 22 at its center for the overflow pipe 19. A heavy felt packing and cushion 23 is secured to this flange 21 by rivets 24, and the flange and packing fits tightly against the flat lower face 3 of the dome. Attaching plates 25 and 26 extend vertically along the side edges of the portion 17 from the ends of the flange 21, said attaching plates being flat and in a transverse plane. Felt cushion and packing strips 27 are secured against the rear faces of these plates 25 and 26 by rivets and said packing strips fit against the transverse flanges 7. From the lower ends of the plates 25 and 26, the corners 28 and 29 and the lower edge 20 of the portion 17 are turned inwardly and upwardly to produce the flat flange 31, and a packing and cushion strip 32 is secured against this flange and fits against the face 12, there being a depression 33 to pass the pipe 11. When the extension is in place there is a practically air-tight joint all the way around the rim 18.

Hinge members 34 are secured in horizontal alinement to extend from the plates 25 and 26 and each hinge comprises an attaching plate 35 secured to the portion 17, the hinge pin 36 being some distance inside of the outer edge of the plate 26. The second hinge member 37 is secured to the hinge pin 36 and has a portion 38 extending outwardly to the flange 5 and a portion 39 bent at right angles and fitting against the inner face of the flange 5, and a portion 40 extending backwardly from the portion 39 and fitting against the inner face of the off-set portion 6 and extending backwardly beyond the edge thereof. Screws 41 are inserted through the flanges 5 and are screw-seated into the portions 39 of the hinges.

Figure 4:
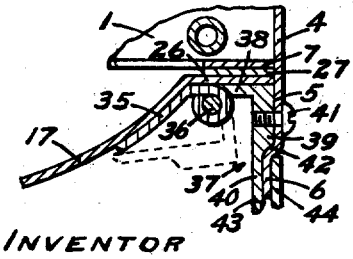
Fig. 4 is an enlarged fragmentary sectional detail on the line 4—4 of Fig. 1.

When the fan housing cooling extension is about to be applied, the members 37 of the hinges are turned inwardly, as shown in dotted lines in Fig. 4, until the fan housing has been seated. Then the members 37 are pressed tightly outwardly to press the housing firmly into its seat, the portions 39 of the hinges fitting against the inclined faces 42 between the flanges 5 and the off-set portions 6, so that when the screws 41 are applied to draw the portions 39 tightly against the flanges 5, the extension will be firmly seated and pressed tightly against the packings and cushions. The packings and cushions serve to form tight joints and to prevent rattling. The extended ends 43 of the hinge members 37 serve as handles for swinging the hinges into and out of position. The hood 44 of the engine fits against the outer faces of the extensions 6 and as soon as the hood is raised the handle portions 43 are accessible, as clearly shown in Fig. 4.

The opening 15 is smaller than the diameter of the fan 45 and the fan sets concentric to the opening 15 and substantially half way between the rear face of the radiator 1 and the edge of the margins 16 around the opening.

I have found by extensive experimenting and use that this construction produces good results. The air is drawn through all parts of the radiating field and is concentrated and directed to the hottest part of the engine, instead of being thrown outwardly to the hood.

Various changes may be made without departing from the spirit of my invention as claimed.

I claim:

1. An extension adapted to be bolted to the rear construction of the radiator of the cooling system of an internal combustion engine for facilitating the induction of air to increase the cooling effect on the radiator and to facilitate the cooling of the engine; said extension consisting of a dished plate having its larger and front portion constructed and arranged to include substantially the entire perforate area at the back of the radiator tubes, and having in its back portion an outlet opening to converge the induced stream of air and direct the same toward the motor.

2. An extension adapted to be bolted to the rear construction of the radiator of the cooling system of an internal combustion engine for facilitating the induction of air to increase the cooling effect on the radiator and to facilitate the cooling of the engine; said extension consisting of a dished plate having its larger and front portion constructed and arranged to include substantially the entire perforate area at the back of the radiator tubes, and having in its back portion an outlet opening to converge the induced stream of air and direct the same toward the motor; the margin of the frame being notched to permit adjustment of the same over construction parts of the organization of the motor.

3. An extension adapted to be bolted to the rear construction of the radiator of the cooling system of an internal combustion engine for facilitating the induction of air to increase the cooling effect on the radiator and to facilitate the cooling of the engine; said extension consisting of a dished rectangular plate having its larger and front portion constructed and arranged to include substantially the entire perforate area at the back of the radiator tubes, and having in its back portion an outlet opening to converge the induced stream of air and direct the same toward the motor; and means for securing the extension securely in place at the rear of the radiator.

4. A water cooling, radiator extension consisting of a plate or sheet of material substantially rectangular in plan and which extension is dished backwardly from its front rectangular portion to form an air chamber at the rear of the radiator; the dished bottom of the extension being provided with an opening for the discharge of air drawn through the interstices of the radiator.

5. A water cooling, radiator extension consisting of a plate or sheet of material substantially rectangular in plan and forming a frame-like portion substantially coextensive with the marginal portion of the radiator frame surrounding the interstitial opening and which extension is dished backwardly from its front rectangular portion to form an air chamber at the rear of the radiator; the dished bottom of the extension being provided with an opening for the discharge of air drawn through the interstices of the radiator.

6. A water cooling, radiator extension consisting of a plate or sheet of material substantially rectangular in plan and which extension is dished backwardly from its front rectangular portion to form an air chamber at the rear of the radiator; the dished bottom of the extension being provided with an opening for the discharge of air drawn through the interstices of the radiator; the said opening being materially smaller than the interstitial area of the radiator frame.

7. The combination with an internal combustion engine and its water cooling radiator, of an extension adapted to be applied to the back frame structure of the radiator so as to encompass the interstitial area; said extension being dished rearwardly from its front frame-like portion and having an opening of smaller area than the area of the said interstitial area; a motor disposed behind the said extension and in juxtaposition to the opening therein; and a fan driven by the motor and operative to draw air through the entire interstitial area of the radiator and cause its discharge through the extension opening against the motor.

8. The combination with a motor cooling radiator, of an internal combustion engine, the said radiator having a substantially rectangular interstitial area; a fan arranged at the rear of the radiator; and an extension adapted to be bolted to the rear construction of the radiator, the said extension having a frame-like front portion encompassing the interstitial area at the back of the radiator and being dished and having a constricted opening at the bottom of the dished portion; whereby when the fan is driven a current of air is drawn through the entire interstitial area of the radiator and dispelled through the constricted opening against an adjacent motor.

9. The combination with a water cooling radiator having a substantially rectangular frame surrounding the radiating tubes; a motor disposed in the rear of the radiator and having its water cooling system connected to the radiator; a fan interposed between the radiator and the adjacent end of the motor; of an extension for increasing the cooling efficiency of the air on the radiator and on the motor; said extension having a front substantially rectangular frame attachable to the frame structure of the radiator; said frame of the extension encompassing the interstitial field or area of the radiator and the extension being bodily dished rearwardly and provided with a substantially central opening disposed in the extension back so that the top edge of the opening is adjacent the plane of the top of the motor, whereby the operation of the fan will draw air through the entire interstitial field of the radiator and dispel it through the opening toward the motor.

10. A fan-housing cooling extension comprising the combination with a radiator and fan, of a seat extending around the rear face of the radiating field, a dished plate having an opening in its center, a rim upon the dished plate, a non-metallic packing and cushion upon the rim and fitting the seat, and hinges secured to the rim and screwed to the radiator to hold the rim right against the cushion and the cushion tight against the seat.

11. A fan-housing cooling extension comprising the combination with a radiator and fan, of flanges extending inwardly from the rear edges of the sides of the radiator in transverse alinement with the rear flat face of the bottom of the radiator, second integral flanges extending backwardly from the sides of the radiator beyond the first flanges, a body formed of sheet metal and having a circular central opening; the margin around the opening being substantially flat in a transverse plane, the intermediate portion surrounding the flat portion being dished, and the rim around the intermediate portion fitting the first flanges and the rear flat face, there being cushions secured to the rim between the flanges and flat face; hinges secured to the sides of the intermediate portion and engaging the second flanges; and means securing the hinges to the second flanges.

12. The combination with a radiator having flat transverse faces at its rear sides and bottom, of a body formed of sheet metal and having a circular central opening; the margin around the opening being transversely flat, the intermediate portion around the margin being dished, and the rim around the intermediate portion being flat to fit the flat faces of the radiator; and hinges secured to the sides of the body; there being integral flanges extending backwardly from the radiator against which the hinges fit and there being means for securing the hinges to the flanges.

In testimony whereof I have affixed my signature hereto.

HERBERT H. HART.